United States Patent [19]

Fujita

[11] E Re. 29,423

[45] Reissued Oct. 4, 1977

[54] TIME CORRECTION DEVICE FOR DIGITAL WATCHES

[75] Inventor: Kinji Fujita, Shimosuwa, Japan

[73] Assignee: Kabushiki Kaisha Suwa Seikosha, Tokyo, Japan

[21] Appl. No.: 553,347

[22] Filed: Feb. 26, 1975

Related U.S. Patent Documents

Reissue of:

[64] Patent No.: 3,717,990
Issued: Feb. 27, 1973
Appl. No.: 208,311
Filed: Dec. 15, 1971

[30] Foreign Application Priority Data

Dec. 17, 1970 Japan ..... 45-112397

[51] Int. Cl.[2] ..... G04B 19/30; G04C 3/00; G04B 27/00

[52] U.S. Cl. ..... 58/50 R; 58/23 R; 58/85.5

[58] Field of Search ..... 58/23 R, 23 A, 50 R, 58/85.5; 307/224; 328/38, 39, 41, 42, 48

[56] References Cited

U.S. PATENT DOCUMENTS

| | | | |
|---|---|---|---|
| 2,823,856 | 2/1958 | Booth et al. | 307/222 R |
| 3,227,893 | 1/1966 | Frank | 307/222 R |
| 3,548,203 | 12/1970 | Basse et al. | 328/48 R |
| 3,596,462 | 8/1971 | Hayes | 58/50 R |
| 3,651,415 | 3/1972 | Glasson | 307/222 R |
| 3,668,859 | 6/1972 | Polin | 58/85.5 |
| 3,777,471 | 8/1971 | Koehler et al. | 58/23 R |

*Primary Examiner*—E. S. Jackmon
*Attorney, Agent, or Firm*—Blum, Moscovitz, Friedman & Kaplan

[57] ABSTRACT

A time correction device for electronic watches having multi-stage divider circuitry for dividing the high frequency output signals of an oscillator into low frequency timing signals including a gate at the input of each divider stage to be corrected for selectively applying to said divider stage the output signal of the prior stage or the inverse of said prior stage output signal. A switch is provided for manually actuating the gate to pass one of the prior stage output signal and the inverse thereof.

12 Claims, 4 Drawing Figures

TIME CORRECTION DEVICE FOR DIGITAL WATCHES

Matter enclosed in heavy brackets [ ] appears in the original patent but forms no part of this reissue specification; matter printed in italics indicates the additions made by reissue.

BACKGROUND OF THE INVENTION

This invention relates to time correction devices for electronic wrist watches, and in particular, to time correction devices for electronic wrist watches in which digital indication is given electronically, as by a liquid crystal or light emitting diode digital display. Further, the arrangement is particularly adapted for electronic watches in which the electronic circuitry thereof is formed of complementary MOS integrated circuits. In the art, time correcting devices for such watches included complicated switching arrangements principally relying upon tranfer switches which are relatively expensive, complex, and large in size. Since space is an important consideration in the design of such electronic watches, particularly wrist watches, it has proved essential to minimize the space occupied by the time correcting devices if such time correcting devices are to be provided at all.

SUMMARY OF THE INVENTION

Generally speaking, in accordance with the invention, a time correction device for electronic watches is provided including time standard oscillator means for producing a high frequency signal and multi-stage divider means coupled to said oscillator means for dividing said high frequency signal into low frequency timing signals. A gate means is connected to the input of each divider means stage to be corrected for selectively applying to said input either the output signal of the prior stage or the inverse thereof. Switch means is connected to each of said gate means for selectively actuating said gate means to pass either of said prior divider means stage output signal or the inverse thereof. Digital display means including liquid crystal display means or light emitting diode display means may be connected to said divider means for the digital display of time in response to said timing signals. Said divider means and gate means may be formed of complementary MOS integrated circuits.

Accordingly, it is an object of this invention to provide a miniaturized, yet simple time correcting device for electronic watches.

Still other objects and advantages of the invention wil in part be obvious and will in part be apparent from the specification and drawings.

The invention accordingly comprises the features of construction, combinations of elements, and arrangement of parts which will be exemplified in the constructions hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which.

DETAILED DESCRIPTION OF THE PREFERRED EMBODIMENTS

Figure 1:
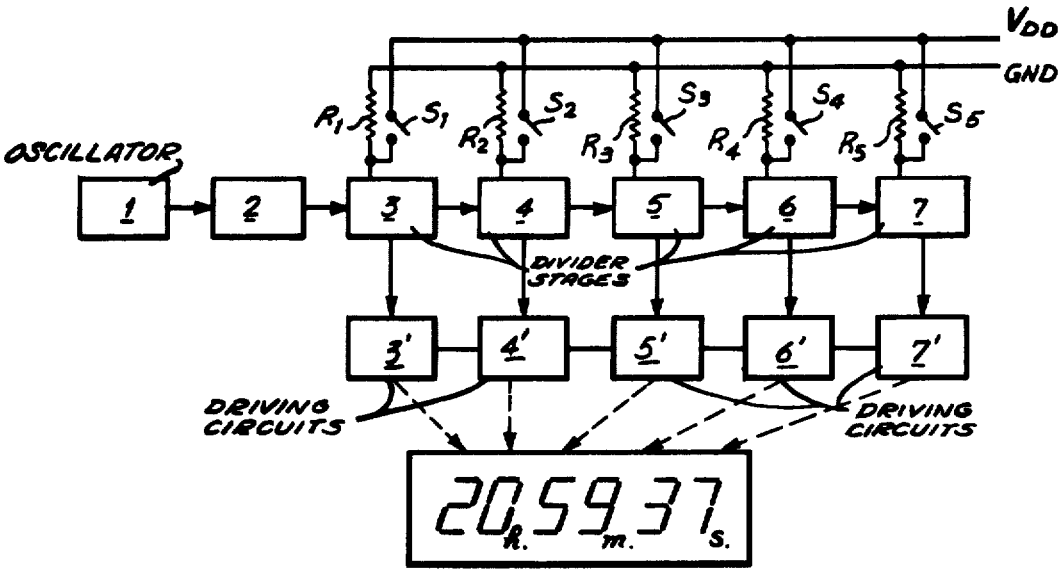
FIG. 1 is a block and circuit diagram of a digital electronic watch incorporating the time correction device according to the invention.

Referring now to FIG. 1, one embodiment of the digital electronic watch according to the invention is schematically depicted by way of block diagram. In said watch, a high frequency signal is produced by a standard oscillator 1 preferably incorporating a quartz vibrator having an oscillating frequency within the range of several kHz to several tens kHz. The high frequency output signal of oscillator 1 is applied to a divider circuit consisting of a plurality of divider stages. The output of the first group of said stages 2 is a 1-second signal which is applied to divider stage 3 which reduces said 1-second signal to a 10-second signal. Further, divider stage 3 applies said 1-second signal to a driving circuit 3' which is coupled to and actuates the unit second digit of the digital display. Similarly, the 10-second signal is applied to the input of divider stage 4 which reduces said signal to a 1-minute signal, while applying the 10-second signal to a driving circuit 4' which drives the 10-second digit of the digital display. The one minute signal is applied to the divider stage 5 which reduces said signal to a 10-minute signal, and which applies said 1-minute signal to a driving circuit 5' which drives the unit minute digit of the digital display. The 10-minute signal is applied to a divider stage 6 which divides said signal into a 1-hour signal and which applies the 10-minute signal to a driving circuit 6' which drives the 10-minute digit of the digital display. Finally, the 1-hour signal is applied to divider stage 7 which divides said signal into a 24-hour signal and which applies said 1-hour signal to driving circuit 7' for driving the hour digits of said digital display.

The time correction device according to the invention includes resistors $R_1$, $R_2$, $R_3$, $R_4$ and $R_5$ which connects divider stages 3, 4, 5, 6 and 7 respectively to ground. Further, a make switch $S_1$, $S_2$, $S_3$, $S_4$ and $S_5$ is connected respectively between a voltage $V_{DD}$ and the respective connection between each of resistors $R_1$, $R_2$, $R_3$, $R_4$ and $R_5$ and the corresponding divider stages. Said make switches perform the time indication correction on each of the 1-second, 10-second, 1-minute, 10-minute, and hour time indication in a manner which will be more particularly described in connection with FIG. 2.

Figure 2:
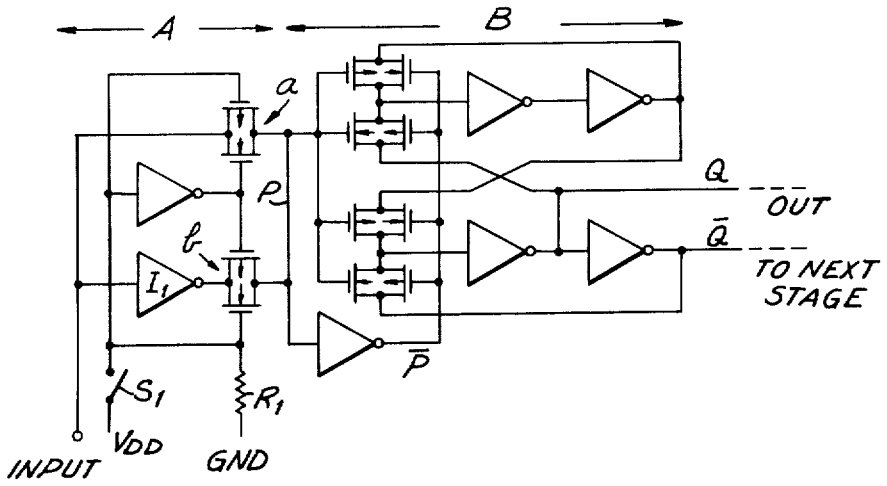
FIG. 2 is a detailed circuit diagram depicting one stage of the divider of FIG. 1 incorporating the time correction device according to the invention.

FIG. 2 shows a detailed circuit diagram of the input portion of divider stage 3. The input portions of each of divider stages 4, 5, 6 and 7 are similarly formed. The circuit of FIG. 2 consists of a gate portion A and a dividing portion B.

Referring first to the gate portion, said portion consists of two transmission gates a and b formed of MOS (metal-oxide semiconductor) transistors connected in the complementary symmetry configuration. During normal operation, when switch $S_1$ is open, a ground voltage of 0 volts is applied through resistance $R_1$ to the gate electrodes of the MOS transistors so that transmission gate a is in the on stage and transmission gate b is in the off state. The output signal of the prior stage of the divider is applied to the input of the circuit of FIG. 2 and transmitted through gate a to the dividing portion B.

When switch $S_1$ is closed for the purpose of time correction, a positive voltage $V_{DD}$ is applied to the gate electrodes of the MOS transistors to change the states of gates a and b so that gate a is in the off state and gate b is in the on state. When in this state, transmission gate b transmits the inverse of the output signal of the prior stage to dividing portion B since said prior stage output signal is inverted by inverter $I_1$. Thus, one pulse is produced by each closing and opening cycle of switch $S_1$. By repeating this operation, the desired number of successive pulses may be delivered to the dividing portion B, resulting in time correction.

Figure 3:
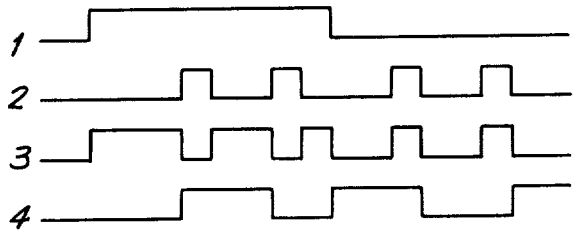
FIG. 3 depicts the voltage waveforms at four locations in the circuit of FIG. 2.

Referring now to FIG. 3, the waveforms of various points in the circuit of FIG. 2 are depicted. Waveform 1 represents the output signal of the prior divider stage. Waveform 2 depicts the pulses produced by the closing and opening of switch $S_1$, the higher voltage level representing the closed position. Waveform 3 represents the input signal to the dividing portion B at point P. Finally, waveform 4 represents the output signal of dividing portion B at point Q.

Figure 4:
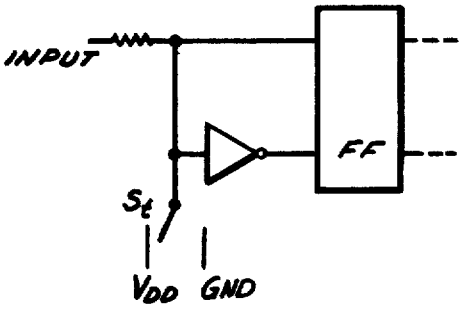
FIG. 4 PRIOR ART
FIG. 4 is a block and circuit diagram of a conventional time correction method.

By providing the time correction arrangement more particularly depicted in FIG. 2 in each of divider stages 3, 4, 5, 6 and 7, time correction may be quickly achieved even if a major correction is required, a particularly advantageous practical result. A more conventional arrangement, such as is shown in FIG. 4, requires the use of a transfer switch $S_n$, rather than the simple make switch of the arrangement according to the invention, thereby resulting in substantially simplified construction, increased reliability, and maximum miniaturization. The slight increase in the area of the MOS integrated circuit defining each divider stage caused by the addition of the gate portion A is almost negligible, and causes no problem. On the other hand, the requirement for additional outer terminals in the arrangement of FIG. 4 results in a substantial increase in the space required for the electronic circuitry, thereby minimizing the benefits achieved from the use of MOS integrated circuits.

The arrangement according to the invention, due to the use of simple switches and a minimum number of elements is particularly adapted for application to small-size watches such as wrist watches while providing high reliability and other advantages.

It will thus be seen that the objects set forth above, and those made apparent from the preceding description, are efficiently attained and, since certain changes may be made in the above constructions without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. A time correction device for electronic watches including time standard oscillator means for producing a high frequency signal, and multi-stage divider circuit means coupled to said oscillator means for dividing said high frequency signal into low frequency timing signals, each of said divider means stages producing an output signal for application to the input of the next stage, comprising a gate means connected to the input of each divider means stage to be corrected for selectively applying to said input either the output signal of the prior divider means stage or the inverse thereof; and manually operated switch means operatively coupled to said gate means for the selection of which of said prior divider means stage output signal or the inverse thereof is passed by said gate means to the input of the divider means stage to be corrected.

2. A time correction device as recited in claim 1, wherein said switch means is a normally open make switch, said gate means passing said prior divider stage input signal to the input of the divider stage to be corrected when said make switch is open and passing the inverse thereof when said make switch is closed.

3. A time correction device as recited in claim 2, wherein said gate means includes first and second gates each adapted to selectively assume on and off states, said prior divider means stage output signal being applied to said first gate; inverter means connected to said second gate, said prior divider stage output signal being applied to said inverter for inversion before application to said second gate; means for normally maintaining said first gate in the on state and said second gate is in off state; said switch means being operatively connected to said first and second gates for changing the state of said first gate to the off state and the state of said second gate to the on state.

4. A time correction device as recited in claim 3, wherein said first and second gates are formed from pairs of complementary MOS transistors.

5. A time correction device as recited in claim 4, wherein said MOS transistors each have a gate electrode, said means for normally maintaining said first and second gates in the on and off states respectively including a resistor connecting said gates to ground, said time correction device including a voltage source, said make switch connecting said voltage source to said MOS transistors' gate electrodes.

6. A time correction device as recited in claim 1, wherein said watch includes a digital liquid crystal display means coupled to said divider means for digitally displaying time in response to said timing signals, said oscillator means including a quartz oscillator, said divider means including complementary MOS integrated circuits.

7. A time correction device as recited in claim 1, wherein said watch includes a digital light emitting diode display means coupled to said divider means for digitally displaying time in response to said timing signals, said oscillator means including a quartz oscillator, said divider means including complementary MOS integrated circuits.

8. A time correction device as recited in claim 1, wherein one of said gate means and switch means is provided for the divider means stages associated with each of the 1-minute timing signal, the 10-minute timing signal, and the 1-hour timing signal.

9. A timing correction device as recited in claim 8, wherein one of said switch means and gate means is provided for each of the divider means stages associates with the 1-second timing signal and the 10-second timing signal.

*10. A time correction device for electronic watches including a time standard oscillator means for producing a*

*high frequency signal, and multi-stage divider circuit means coupled to said oscillator means for dividing said high frequency signal into low frequency timing signals, each of said divider mean stages producing an output signal for application to the input of the next stage, the improvement comprising switching means connected to the input of each divider means stage to be corrected to selectively adding an additional pulse to the output signal of the divider means stage next previous to each divider means stage to be corrected for application to the input of the connecting divider stage to be corrected in response to each actuation of said switching means whereby the output signal of each next-previous divider stage is not rendered-discontinuous by the adding of pulses thereto.*

*11. A time correction device as claimed in claim 10 wherein said switching means includes a manually operated switch, associated with each divider means stage to be corrected, each actuation of said switch producing said additional correction pulse.*

*12. A time correction device as claimed in claim 10 wherein said switching means further includes a gate means coupled intermediate each said manually operated correction switch and said input of each of said divider means stages to be corrected, said gate means selectively applying to said input either the output signal of the prior divider stage means or the inverse thereof, actuation of said manually operated switches effecting a selective application of said prior divider means stage output signal or the inverse thereof to said input of the divider means stage to be corrected.*

* * * * *